United States Patent [19]

Yui et al.

[11] Patent Number: 4,620,744
[45] Date of Patent: Nov. 4, 1986

[54] SLIDE DOOR LOCKING DEVICE FOR VEHICLES DURING FEEDING OF FUEL TO A FUEL TANK POSITIONED NEAR A SLIDE DOOR

[75] Inventors: Yasuo Yui, Isehara; Kazunori Kawamo, Atsugi, both of Japan

[73] Assignee: Nissan Shatai Co. Ltd., Hiratsuka, Japan

[21] Appl. No.: 677,384

[22] Filed: Dec. 3, 1984

Related U.S. Application Data

[62] Division of Ser. No. 410,892, Aug. 24, 1982, abandoned.

[51] Int. Cl.4 .............. B60J 5/06; B60K 28/16
[52] U.S. Cl. .................... 296/155; 137/351; 180/286; 280/152 A; 292/78; 292/223; 292/DIG. 16; 292/DIG. 65; 296/1 C
[58] Field of Search ............ 292/196, 223, DIG. 38, 292/DIG. 16, DIG. 49, 78, DIG. 65; 180/286, 289; 296/1 C, 155; 280/152 A; 137/351, 377

[56] References Cited

U.S. PATENT DOCUMENTS

| Re. 14,741 | 10/1919 | Anderson | 292/DIG. 49 X |
|---|---|---|---|
| 275,903 | 4/1883 | Gross | 292/DIG. 16 X |
| 525,682 | 9/1894 | Fisher | 292/223 |
| 1,076,796 | 10/1913 | Sundgaard | 292/78 |
| 1,765,615 | 6/1930 | Roedding et al. | 292/DIG. 49 X |
| 2,117,339 | 5/1938 | Claud-Mantle | 292/223 X |
| 2,143,575 | 1/1939 | Raymond | 292/223 |
| 2,293,700 | 8/1942 | Curtiss | 292/78 X |
| 2,309,049 | 1/1943 | Curtiss et al. | 292/223 X |
| 2,466,993 | 4/1949 | Lickteig | 292/78 |
| 2,469,113 | 5/1949 | Hooker | 292/223 X |
| 3,690,708 | 9/1972 | Worley et al. | 292/DIG. 65 X |
| 3,797,871 | 3/1974 | Morishita | 292/DIG. 65 X |
| 4,068,871 | 1/1978 | Mercer | 292/223 X |
| 4,127,016 | 11/1978 | Ibsen | 292/196 X |
| 4,500,121 | 2/1985 | Ferrero | 292/79 |

FOREIGN PATENT DOCUMENTS

| 2418063 | 10/1975 | Fed. Rep. of Germany | 180/286 |
|---|---|---|---|
| 2275974 | 1/1976 | France | 292/78 |
| 28019 | 3/1981 | Japan | 180/286 |

Primary Examiner—Robert L. Wolfe
Assistant Examiner—Russell W. Illich
Attorney, Agent, or Firm—Rosen, Dainow & Jacobs

[57] ABSTRACT

A slide door locking device for vehicles during feeding of fuel to a fuel tank positioned near a slide door, wherein a stopper lever is so pivotally mounted inside a panel of a body, the panel defining the rear end of a door opening, that the front end of the stopper lever may project into the door opening beyond the front end of the panel and engage with a stop member attached to the slide door, and an actuating lever is pivotally disposed to the panel, projecting into a hollow formed in the panel, for a fuel supply inlet, and is coupled to the rear end of the stopper lever via a link member. When the actuating lever is operated during feeding of fuel to a fuel tank, the front end of the stopper lever engages with the stop member of the slide door to prevent it from opening when it is opened. The stopper lever may be biased by a spring to a stop position so that the engage of the stopper lever with the stop member may be disengaged by further pivoting the stopper lever against the spring, thereby opening the slide door even when the fuel is fed to the fuel tank.

5 Claims, 24 Drawing Figures

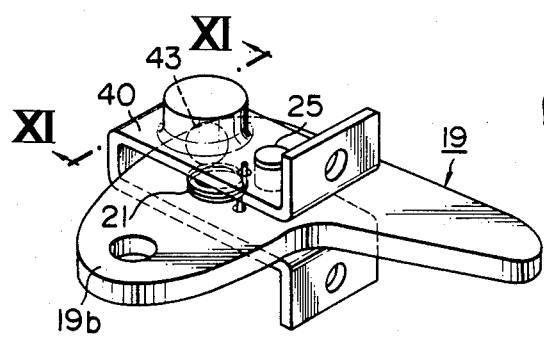
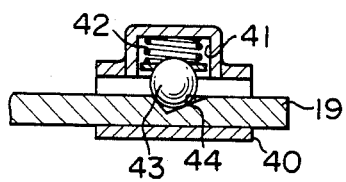
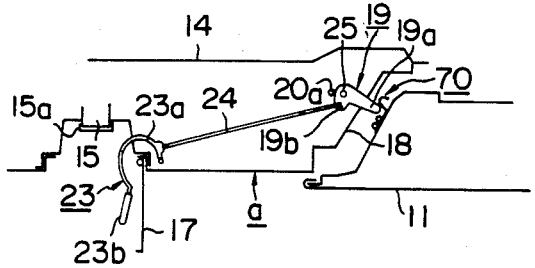
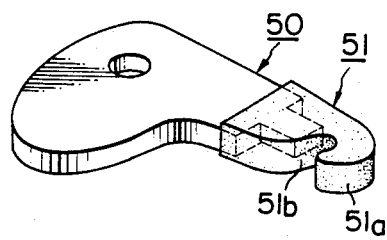
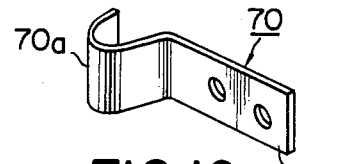
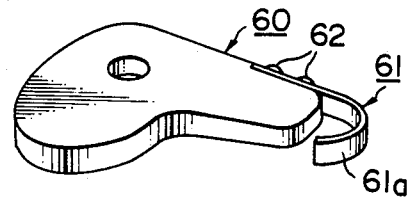
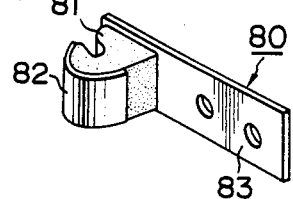
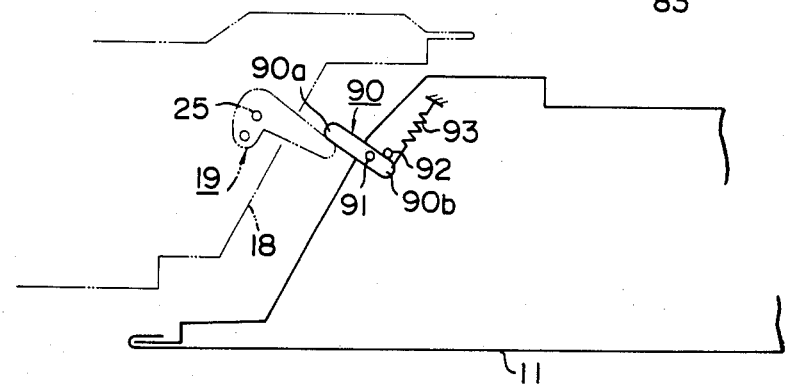

1

SLIDE DOOR LOCKING DEVICE FOR VEHICLES DURING FEEDING OF FUEL TO A FUEL TANK POSITIONED NEAR A SLIDE DOOR

This is a division of application Ser. No. 410,892, filed Aug. 24, 1982 A Slide Door Locking Device for Vehicles During Feeding of Fuel to a Tank Positioned Near a Slide Door, now abandoned.

BACKGROUND OF THE INVENTION

The present invention relates to an improvement of a slide door locking device for vehicles during feeding fuel to a fuel tank positioned near a slide door.

In a vehicle having a slide door in its side and a fuel supply inlet within the limits of its movement, when the slide door is opened by mistake or oversight during feeding of fuel to a fuel tank, a fuel lid opened and a fuel supply gun are damaged or broken, and further the fuel supply gun comes off the fuel supply inlet, with the result that the fuel is spilt over.

In order to remove this defect, special door lock means for locking the slide door during feeding of the fuel to a fuel tank, have been proposed. One example of the conventional door lock means is shown in FIG. 1. In this embodiment, inside a slide door 1 a pivot bar 4 having a hook end 4a and the other end 4b projecting beyond an end surface 1a of the slide door 1, is pivotally mounted, and the hook end 4a engages with a pivot arm 3 which is pivotally connected to a rod 2 coupled to a lock body (not shown).

On the other hand, inside a body 5 of the vehicle an actuating lever 9 which is pivoted by the open-close movement of a fuel lid 7 for convering a fuel supply inlet 6 of a fuel tank via an open stopper 8, is provided. One end 9a of the actuating lever 9 is so projected beyond a door butting surface 5a of the body 5, corresponding to the other end 4b of the pivot bar 4, that the one end 9a of the actuating lever 9 may engage with the other end 4b of the pivot bar 4 when the fuel lid 7 is opened, thereby locking the door lock means. The slide door 1 is opened in a direction shown by an arrow X.

However, in this embodiment, when the fuel lid 7 is opened, the door lock can be never unlocked. Accordingly, persons in the vehicle can not get out quickly even in case of emergency. Further, such a conventional door lock means is composed of a lot of elements and is constructed in many steps, which means high cost and larger weight.

SUMMARY OF THE INVENTION

It is an object of the present invention to provide a slide door locking device for vehicles during feeding of fuel to a fuel tank positioned near a slide door, free from the aforementioned defects, which is simple in construction and is reliable and safe.

It is a further object of the present invention to provide a slide door locking device for vehicles, which is capable of opening the slide door to a certain width so that the person in the vehicle may escape therefrom in case of emergency even when the fuel is fed to a fuel tank.

According to the present invention there is provided a slide door locking device for vehicles during feeding of fuel to a fuel tank positioned near a slide door, comprising (a) a stop member attached to the rear end of a slide door, (b) a stopper lever which is so mounted pivotally inside a panel of a body of a vehicle, the panel defining the rear end of a door opening, that the front end of the stopper lever may project into the door opening beyond the front end of the panel and engage with the stop member, (c) an actuating lever which is pivotally disposed to the panel, and whose free end projects into a hollow, formed in the panel, for a fuel supply inlet, and (d) a link member which couples the rear end of the stopper lever and the base part of the actuating lever, wherein, when the actuating lever is operated during feeding of fuel to a fuel tank in order to project the front end of the stopper lever into the door opening, so that the front end of the stopper lever may engage with the stop member of the slide door when the slide door is opened, thereby locking the slide door from opening.

The present invention also envisages a slide door locking device for vehicles, wherein the stopper lever is so biased to a stop position by a spring, where the stopper lever engages with the stop member to lock it when the actuating lever is operated during feeding of the fuel to the fuel tank, that the engagement of the stopper lever with the stop member may be disengaged by further pivoting the stopper lever from the stop position by giving a certain force to the slide door against the biasing force of the spring, thereby opening the slide door even when the fuel is fed to the fuel tank.

BRIEF DESCRIPTION OF THE DRAWINGS

In order that the present invetion may be better understood, preferred embodiments thereof will be described with reference to the accompanying drawings, wherein the similar numerals denote the similar parts through the drawings, and hence the descriptions thereof can be omitted to avoid the repeated explanations, in which:

FIG. 10 is a perspective view of a stopper lever and a bracket for mounting it to the panel, shown in FIG. 7;

FIG. 11 is a longitudinal cross section, taken along the line XI—XI of FIG. 10;

FIG. 12 is a perspective view of another embodiment of a stop member used in the device of FIG. 2;

FIG. 13 is a perspective view of still another embodiment of a stopper lever used in the device of FIG. 2;

FIG. 14 is an elevational view of another embodiment of a slide door locking device according to the present invention;

FIG. 15 is a perspective view of a stop member shown in FIG. 14;

FIG. 16 is a perspective view of another embodiment of a stop member used in the device shown in FIG. 14; and FIG. 17 is an elevational view of further embodiment of a stop member used in the device shown in FIG. 14.

DESCRIPTION OF THE PREFERRED EMBODIMENTS

Figure 1:
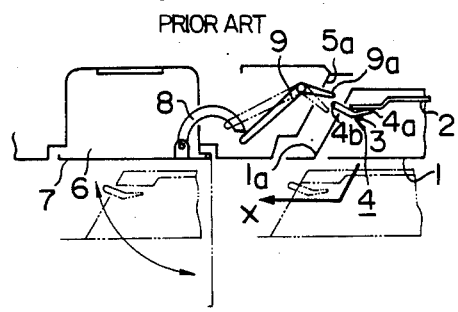
FIG. 1 is an elevational view of a conventional slide door lock means.
Figure 4:
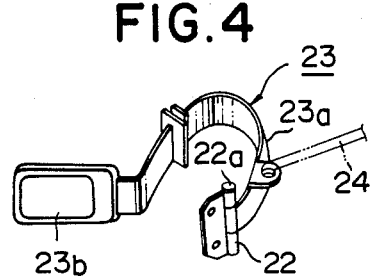
FIG. 4 is a perspective view of an actuating lever of FIG. 2.
Figure 2A:
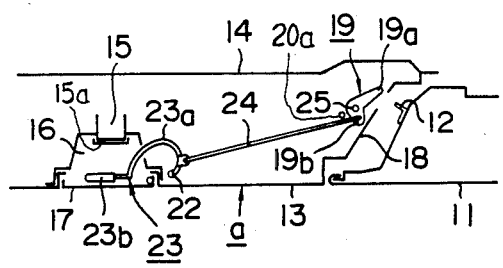
FIGS. 2a and 2b are elevational views of the first embodiment of a slide door locking device for vehicles according to the present invention, showing slide door open and stop positions.
Figure 2B:
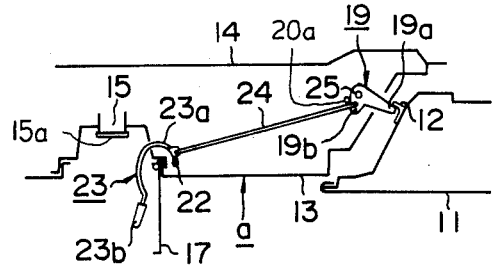
Figure 3:
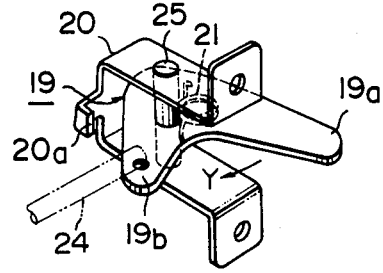
FIG. 3 is a perspective view of a stopper lever to be mounted pivotally to a panel via a bracket, shown in FIG. 2.

Referring to the drawings there is shown in FIGS. 2-4 the first embodiment of a slide door locking device for vehicles according to the present invention.

To a slide door 11 a stop member 12 having a L-shaped cross section is mounted in its rear end, and a denotes a rear fender of a vehicle, which comprises an outer panel 13 and an inner panel 14. The rear fender a is provided with a hollow 16 open to the outside, in which a fuel supply inlet 15 of a fuel tank is arranged, within the limits of the movement of the slide door 11 when it is opened. The fuel supply inlet 15 is convered by a fuel cap 15a. The hollow 16 is covered with a fuel lid 17 which is pivotally mounted to the outer panel 13.

Inside the front end 18 of the rear fender a, the front end 18 defining the rear end of a door opening, a stopper lever 19 is pivotally mounted via a bracket 20 and a support shaft 25 so that the front end 19a of the stopper lever 19 may project into the door opening beyond the front end 18 of the rear fender a and engage with the stop member 12 to lock the slide door from the opening when it is projected. A click spring 21 is fitted between the stopper lever 19 and the bracket 20, as shown in FIG. 3, and biases the stopper lever 19 to the two positions, i.e. so that the front end 19a of the stopper lever 19 may be usually positioned within the rear fender a, or the front end 19a of the stopper lever 19 may project into the door opening when the fuel is fed to the fuel tank. A stop part 20a of the bracket 20 stops the pivot movement of the stopper lever 19 further from the stop position or the engage position.

A rear end 19b of the stopper lever 19 is connected to a base portion of an arm part 23a having an arcuate form of an actuating lever 23 which is pivotally mounted on the inner side of the outer panel 13 near the hollow 16 via a hinge 22 and a pivot pin 22a, through a link member such as a rod 24. An operating part 23b of the actuating lever 23 is connected to the free end of the arm part 23a projecting the hollow 16.

Now, when the fuel is fed to the fuel tank, the fuel lid 17 is opened and then the actuating lever 23 is pulled out, with the result that the stopper lever 19 is pivoted in a direction shown by an arrow Y, via the rod 24 and the front end 19a projects into the door opening. In this situation, when the slide door 11 is opened by mistake or oversight, the front end 19a of the stopper lever 19 engages with the stop member 12 of the slide door 11 and thus locks the slide door 11 from the opening.

After feeding of the fuel, the actuating lever 23 is returned to the normal position or the open position, and the stopper lever 19 is pivoted reversely to the above description, resulting in retracting the front end 19a of the stopper lever 19 within the rear fender a. Hence, after closing the fuel lid 17, the slide door 11 can be opened freely without any damage of the fuel lid 17 and the actuating lever 23.

Figure 5A:
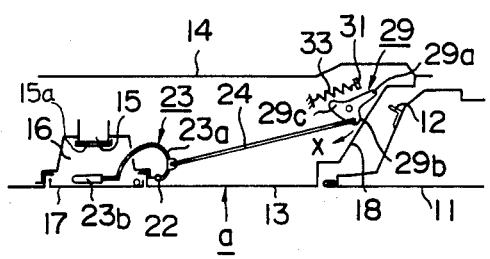
FIGS. 5a, 5b and 5c are elevational views of the second embodiment of a slide door locking device for vehicles according to the present invention, showing functions thereof.
Figure 5B:
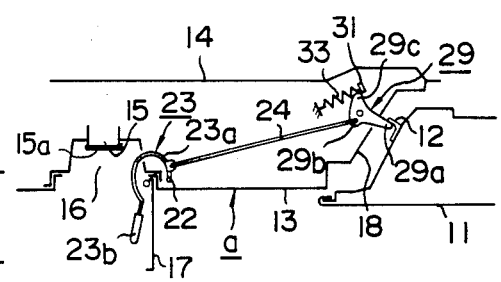
Figure 5C:
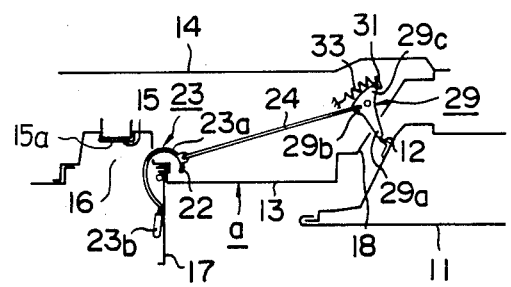
Figure 6:
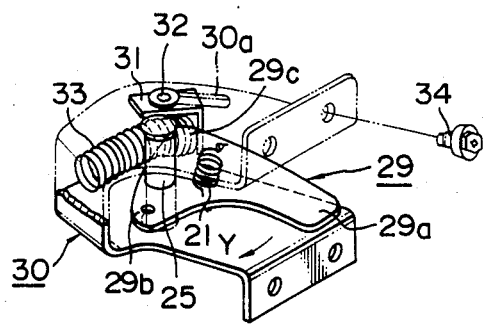
FIG. 6 is a perspective view of a stopper lever to be mounted pivotally to a panel via a bracket, shown in FIG. 5.

In FIGS. 5 and 6 there is shown the second embodiment of a slide door locking device for vehicles according to the present invention.

In this embodiment, a stopper lever 29 having a front end 29a, a rear end 29b and a middle projection 29c is pivotally mounted via a bracket 30 inside the front end 18 of the rear fender a, in the similar manner to the stopper lever 19 of the first embodiment, and is connected to the actuating lever 23 via the rod 24.

The bracket 30 is provided with a slot 30a having approximately an arcuate form in its one side, and stop piece 31 having a L-shaped cross section is slidably mounted in the slot 30a through a pin 32. A coil spring 33 is disposed between the bracket 30 and the stop piece 31, and biases the stop piece 31 to one end by pulling it, as shown in FIG. 6. The bracket 30 is mounted to the front end 18 of the rear fender a by screws 34.

When the fuel is supplied, the fuel lid 17 is opened and the actuating lever 23 is pulled out in order to pivot the stopper lever 29, as shown by the arrow Y in FIG. 6. Thus, the middle projection 29c of the stopper lever 29 butts against the stop piece 31 to stop the pivot movement of the stopper lever 29, and in the same time the front end 29a of the stopper lever 29 projects into the door opening and engages with the stop member 12 mounted to the slide door 11 to lock the slide door 11 from the opening when the slide door 11 is opened by mistake or oversight.

However, in this embodiment, when the slide door 11 is opened with a certain force against the biasing force of the spring 33 by further pivoting the stopper lever 29, i.e. by pushing the stop piece 31 by the middle projection 29c against the spring 33. Then, the engagement of the stop member 12 with the stopper lever 29 is disengaged, thereby opening the slide door 11 during feeding of the fuel to the fuel tank, as shown in FIG. 5c.

After feeding of the fuel oil, the actuating lever 23 is returned to the normal position, and the stopper lever 29 is retracted within the rear fender a. Then, the fuel lid 17 is closed, and the slide door 11 can be opened freely.

In this embodiment, the rod 24 may be coupled to the fuel lid 17 directly instead of connecting the actuating lever 23 which will be omitted, and hence the stopper lever 29 is pivoted by opening and closing the fuel lid 17.

Further, the form of the stop piece 31 is not restricted to the L-shaped cross section, and other shapes can be possible as long as its function is maintained, for example, a U-shaped cross section is possible. A warning means may be provided to the slide door locking device for vehicles of the present invention described above. It warns the opening of the slide door during feeding of the fuel to the fuel tank.

The length of the rear fender a or the distance between the slide door opening and the fuel supply inlet may be, of course, determined properly so that the person within the vehicle may escape in case of emergency when supplying the fuel.

Figure 7A:
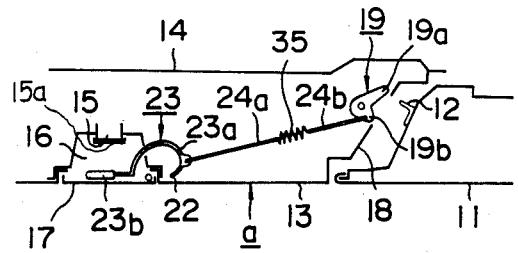
FIGS. 7a, 7b and 7c are elevational views of the third embodiment of a slide door locking device for vehicles according to the present invention, showing functions thereof.
Figure 7B:
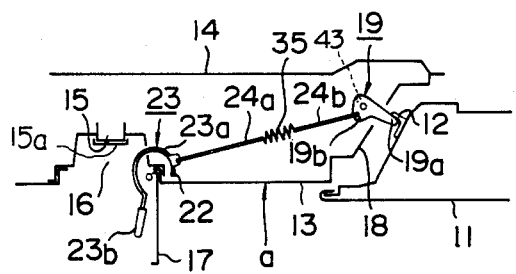
Figure 7C:
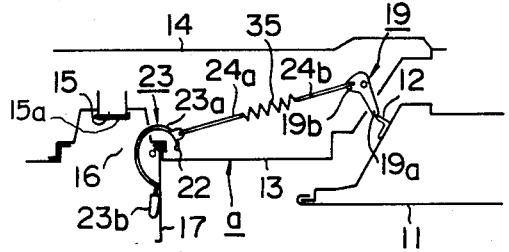

In FIG. 7 there is shown the third embodiment of the slide door locking device for vehicles according to the present invention.

In this embodiment, the stopper lever 19 is pivotally mounted to the rear fender a via a bracket 40 which has no stop part such as the one shown in FIG. 3, in the similar manner to the first embodiment of the present invention, as shown in FIGS. 10 and 11. A spring 35 is inserted in the middle part of a rod comprising a rear rod member 24a and a front rod member 24b, and biases the stopper lever 19 to the stop position or engage position where the front end 19a of the stopper lever 19 engages with the stop member 12 of the slide door 11.

The stopper lever 19 is further pivoted from the stop position by giving a certain force to the slide door 11 against the biasing force of the spring 35, thereby opening the slide door 11 even when the fuel is fed to the fuel tank, in the similar manner to the second embodiment described above. The same functions and effects can be obtained as those of the second embodiment.

In this embodiment, as shown in FIGS. 10 and 11, the stopper lever 19 is stopped in the stop position by engaging a ball 43 which is arranged between the bracket 40 and the stopper lever 19 via a coil spring 42 and a hollow 41 formed in the bracket 40, with a notch 44 formed on the surface of the stopper lever 19, the coil spring 42 biasing the ball 43 onto the stopper lever 19.

Figure 8A:
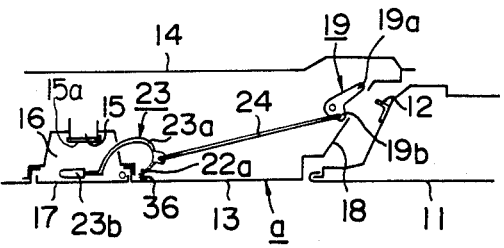
FIGS. 8a, 8b and 8c are elevational views of the fourth embodiment of a slide door locking device for vehicles according to the present invention, showing functions thereof.
Figure 8B:
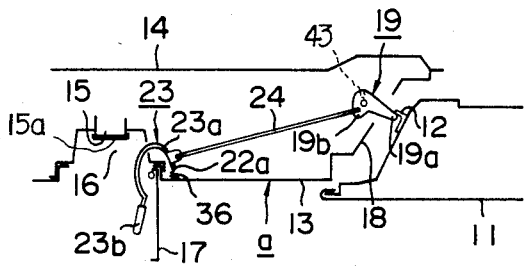
Figure 8C:
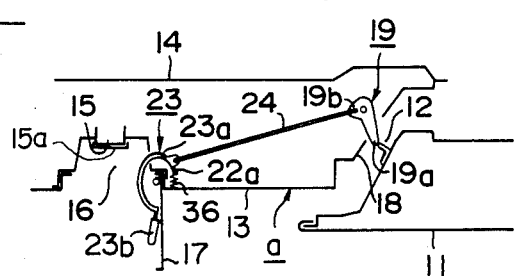
Figure 9:
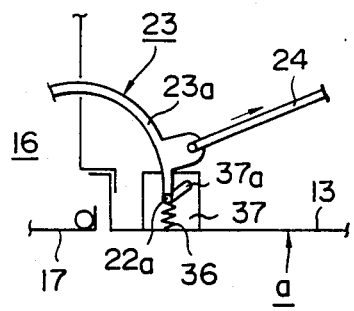
FIG. 9 is an enlarged elevational view of the essential part of FIG. 8.

In FIGS. 8 and 9 there is shown the fourth embodiment of the slide door locking device for vehicles according to the present invention, whose construction is almost the same as the third embodiment, except the followings.

In this embodiment, the actuating lever 23 is pivotally mounted to the outer panel 13 through a bracket 37 having a slot 37a extending in a direction towards the stopper lever 19, and the pivot pin 22a which is movably fitted in the slot 37a and is biased to one end thereof by a spring 36 whose ends are connected to the pivot pin 22a and the outer panel 13.

The stopper lever 19 is further pivoted from the stop position by giving a certain force to the slide door 11 against the biasing force of the spring 36, while the pivot pin 22a is pulled out and moved in and along the slot 37a towards the other end thereof, thereby opening the slide door 11, in the similar manner to the third embodiment. In this embodiment, the same functions and effects as those of the second and the third embodiments.

In FIG. 12 there is shown another embodiment of a stopper lever 50, and a front end member 51 which is fitted on the front end of the stopper lever 50. The front end member 51 having a front end 51a and a thinned part 51b for helping the deformation is made of an elastic material such as a rubber and a plastic material.

The stopper lever 50 made of an elastic material is used instead of the stopper lever 19 shown in FIG. 2. In this case, when the stopper lever is pivoted to the stop position by operating the actuating lever 23, as shown in FIG. 2b, and then a certain force is added to the slide door 11 outwards, the free end of the stop member 12 pushes the front end 51a of the front end member 51 and deforms the front end 51a, i.e. allows to pivot it by deforming. Then, the engagement of the stopper lever 50 with the stop member 12 is disengaged, thereby opening the slide door during feeding of the fuel to the fuel tank. The same functions and effects as those of the second, the third and the fourth embodiments can be obtained.

In FIG. 13 there is shown still another embodiment of a stopper lever 60 and a front end member 61 mounted to the front end of the stopper lever 60 through screws 62. This front end member 61 having a front end 61a is made of a flexible material and thus this can be used instead of the stopper lever 50 of FIG. 12. Hence, the same functions and effects as those of the stopper lever 50 can be obtained.

In FIG. 14 there is shown further embodiment of the slide door locking device according to the present invention.

In this embodiment, another stop member 70 is mounted to the rear end of the slide door 11 instead of the stop member 12, in the same manner as the embodiment of FIG. 2, and the other elements are the same as those of FIG. 2. FIG. 15 is an enlarged perspective view of the stop member 70 having a flexible free end 70a and a base part 70b which is mounted to the rear end of the slide door 11 by screws.

In this embodiment, when the stopper lever 19 is positioned in the stop position during feeding of fuel to the fuel tank, and a certain force is given to the slide door 11 outwards, the free end 70a of the stop member 70 is deformed by the stopper lever 19 engaging therewith. Then, the engagement of the stopper lever 19 with the free end 70a of the stop member 70 is disengaged, thereby opening the slide door 11 during feeding of the fuel to the fuel tank. The same advantages as those of the second embodiment can be obtained.

In FIG. 16 there is shown another embodiment of a stop member 80 comprising a flexible free end member 81 having a thinned part, made of an elastic material, a free end cover 82 attached to the end of the free end member 81, and a base member 83 which is mounted to the rear end of the slide door 11 by screws. This stop member 80 can be replaced with the stop member 70 of FIG. 15. The same functions and effects as those of the stop member 70 can be obtained.

In FIG. 17 there is shown still another embodiment of a stop member 90 which can be replaced with the stop member 70 of FIGS. 14 and 15. In this embodiment, the stop member 90 is pivotally mounted to the rear end of the slide door 11 around a pivot pin 91, and is biased to the stop position where the stopper lever may engage with the stop member during feeding of the fuel to the fuel tank, by a spring 93 connected to the base end 90b of the stop member 90, a stop pin 92 stopping the pivot movement of the stop member 90 against the spring 93.

When the stopper lever 19 is positioned in the stop position during feeding of the fuel to the fuel tank, and a certain force is given to the slide door 11 outwards, the free end 90a of the stop member 90 is pushed by the stopper lever 19 to pivot against the spring 93. Then, the engagement of the stopper lever 19 with the stop member 90 is disengaged, thereby opening the slide door 11 during feeding of the fuel to the fuel tank. In this embodiment, the same functions and effects as those of the embodiment of FIGS. 14 and 15, can be obtained.

It is readily understood from the above descriptions that since the slide door is basically locked from opening during feeding of the fuel to the fuel tank, the fuel supply inlet can be arranged within the limits of the movement of the slide door, and the size of the slide door can be extended, and that since the slide door can be opened to a certain width by giving a certain force to the slide door against the biasing force of the spring, the person within the vehicle can escape therefrom in case of emergency even when the fuel is fed. Further, since the actuating lever 23 and the fuel lid 17 are independently mounted to the rear fender a, each member can be replaced and adjusted independently, and a fuel lid opening mechanism can be provided, and further there is no factor which causes the distortion of the fuel lid by means of the actuating lever connected thereto.

Although the present invention has been described in some detail by way of illustration and example for purposes of clarity of understanding, it will, of course, be understood that various changes and modifications may be made in the form, details, and arrangements of the parts without departing from the scope of the present invention.

What is claimed is:

1. In a vehicle having a body with a door opening, a slide door for sliding from a first to a second position to cover and expose respectively said door opening, and a fuel tank with a fuel inlet and fuel cap, said door when in said open position obstructing access to said fuel inlet and fuel cap, the improvement comprising a locking device for the slide door, said locking device being made operative during feeding of fuel to said tank and including:

(a) a stop member attached to the rear end of said slide door;

(b) a stopper lever mounted pivotally inside a body panel of said vehicle, the panel defining the rear end of said door opening, an end of the stopper lever being subject to projecting into the door opening beyond the front end of the panel and when said door is in said first position engaging with the stop member to obstruct opening of said slide door;

(c) actuating lever means disposed in front of said fuel inlet cap and in one position covering said fuel supply inlet and cap within the panel;

(d) a link member coupling the rear end of the stopper lever and the base part of the actuating lever means; and (e) a spring for biasing the stopper lever to a stop position where the stopper lever engages with the stop member to lock said door in said first position to said panel when the actuating lever means is operated to expose said fuel inlet and cap during feeding of fuel to a fuel tank, said engagement preventing the slide door from opening, said engagement of the stopper lever with the stop member being subject to release by further pivoting the stopper lever from the stop position by applying force of predetermined magnitude to the slide door, said door stop member acting on said stopper lever against the biasing force of the spring, said applied force moving said stopper lever permitting opening of the slide door after said actuating lever means is pivoted to expose said fuel inlet.

2. A slide door locking device as defined in claim 1, wherein the actuating lever means comprises an actuating lever separated from a fuel lid.

3. A slide door locking device as defined in claim 1, wherein the actuating lever means comprises a part of a fuel lid.

4. A slide door locking device as defined in claim 1, wherein the spring is arranged between a stop piece and a bracket by which the stopper lever is pivotally mounted to the panel, and wherein the stopper lever is further pivoted from the stop position and pushes the stop piece against the spring so as to open the slide door.

5. A slide door locking device as defined in claim 1, wherein the spring is inserted in the middle portion of the link member, and wherein the stopper lever is further pivoted from the stop position against the spring so as to open the slide door.

* * * * *

UNITED STATES PATENT AND TRADEMARK OFFICE
CERTIFICATE OF CORRECTION

PATENT NO. : 4,620,744
DATED : November 4, 1986
INVENTOR(S) : Yasuo Yui et al.

It is certified that error appears in the above-identified patent and that said Letters Patent is hereby corrected as shown below:

Column 1, line 18, change "a fuel lid opened" to --an opened fuel lid--.

Column 1, line 61, change "fed to a" to --fed to the--.

Column 2, line 30, change "invetion" to --invention--.

Column 2, line 35, omit "the".

Column 3, line 2, change "stop member" to --stopper lever--.

Column 3, line 55, after "projecting" insert --in--.

Column 3, line 64, after "from" omit --the--.

Column 4, line 11, change "in the similar manner" to --in a manner similar--.

UNITED STATES PATENT AND TRADEMARK OFFICE
CERTIFICATE OF CORRECTION

PATENT NO. : 4,620,744

DATED : November 4, 1986

INVENTOR(S) : Yasuo Yui et al.

It is certified that error appears in the above-identified patent and that said Letters Patent is hereby corrected as shown below:

```
Column 4, line 31, after "from" omit --the--.

Column 4, line 57, after "warns" insert --of--.

Column 5, lines 13 and 40, change "in the similar manner" to --in a manner similar--.

Column 5, line 42, after "effects" insert --are obtained--

Column 5, line 57, changed "to pivot it" to --it to pivot--.
```

Signed and Sealed this

Twenty-sixth Day of January, 1988

Attest:

DONALD J. QUIGG

Attesting Officer

Commissioner of Patents and Trademarks